US005312472A

United States Patent [19]

Shull

[11] Patent Number: 5,312,472

[45] Date of Patent: May 17, 1994

[54] METHOD FOR MANUFACTURING RESONANT CAVITY FOR LASER

[75] Inventor: William A. Shull, Aptos, Calif.

[73] Assignee: Spectra-Physics Lasers, Inc., Mountain View, Calif.

[21] Appl. No.: 950,415

[22] Filed: Sep. 23, 1992

[51] Int. Cl.[5] ........................ C03B 27/02; C03C 25/02

[52] U.S. Cl. ........................................... 65/43; 65/32.2; 65/34; 65/59.23; 65/59.24; 65/60.2

[58] Field of Search ................ 65/42, 43, 60.2, 59.23, 65/32.2, 4.2, 4.21, 59.22, 59.24, 34

[56] References Cited

U.S. PATENT DOCUMENTS 3,502,786 3/1970 Stoll .................................. 65/59.22
4,893,314 1/1990 Shull et al. .......................... 372/107
4,976,806 12/1990 Iwamoto et al. ...................... 65/43

FOREIGN PATENT DOCUMENTS 4521389 7/1970 Japan ...................................... 65/43
468643 7/1937 United Kingdom ............... 65/59.24

*Primary Examiner*—Robert L. Lindsay
*Attorney, Agent, or Firm*—Haynes & Davis

[57] ABSTRACT

A method for affixing the optics of a laser to the laser tube, comprising: providing a substrate seat, coupling a substrate to the seat, coating the substrate with a multi-layer thin film coating, and securing the substrate seat to the laser tube. In a further aspect, a method for manufacturing a resonant cavity is disclosed, the method comprising: providing a laser tube having first and second ends, securing a substrate mount, having a coated output coupler secured thereto, into one end of the laser tube, securing a substrate mount, having a coated reflecting mirror secured thereto, into the other end of the laser tube, and sealing the laser tube.

32 Claims, 4 Drawing Sheets

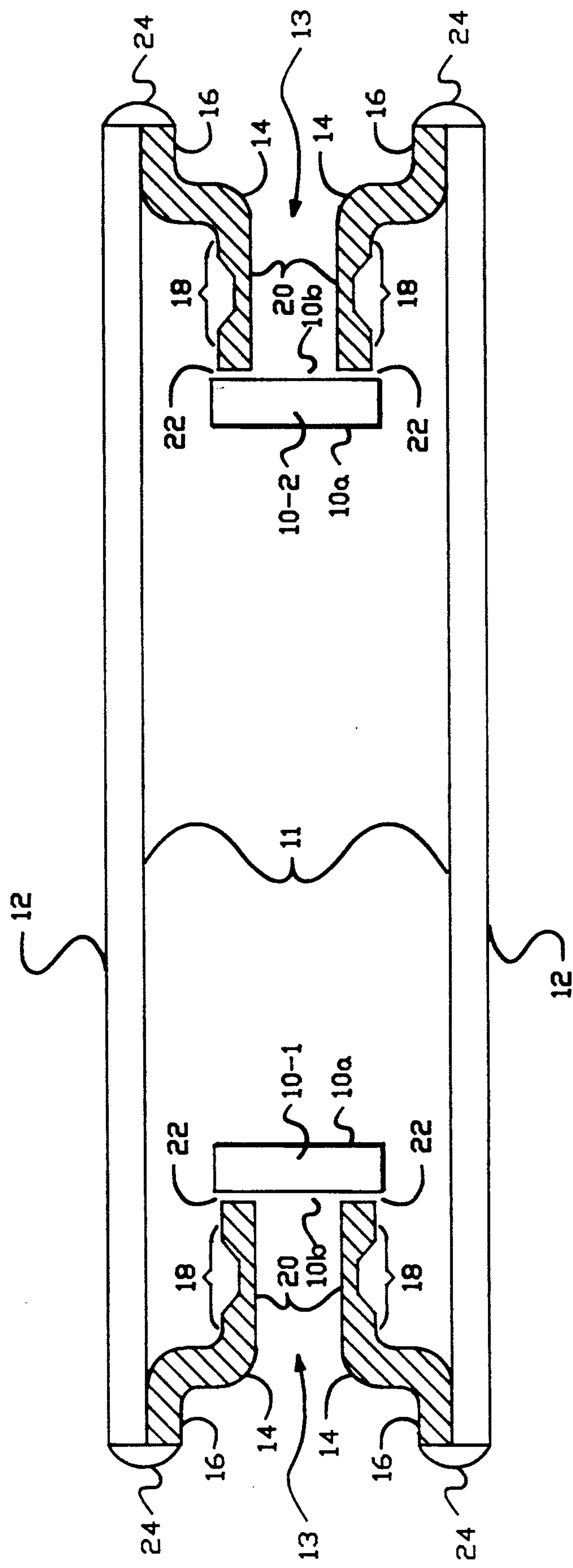
FIG. — 1

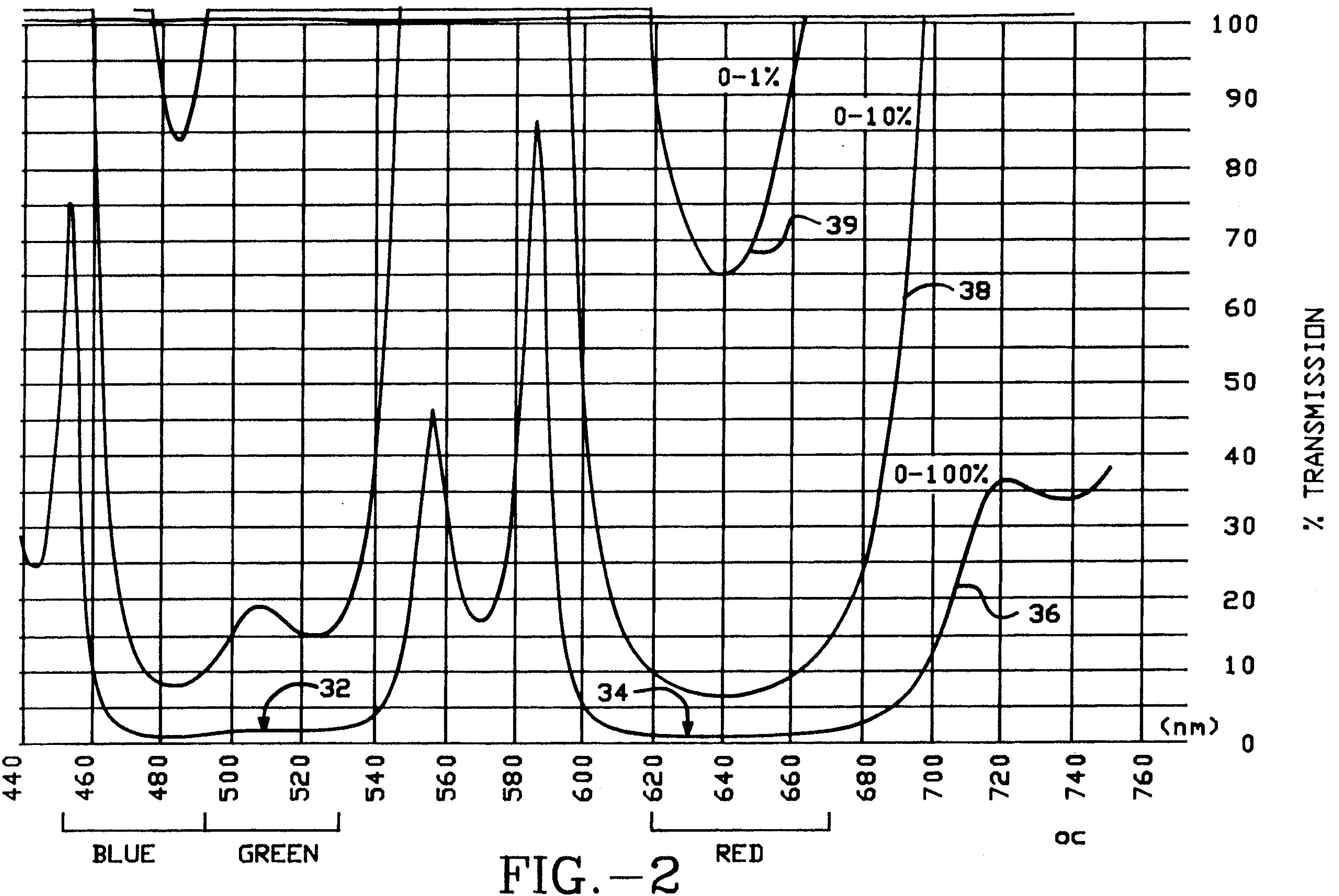
FIG.—2

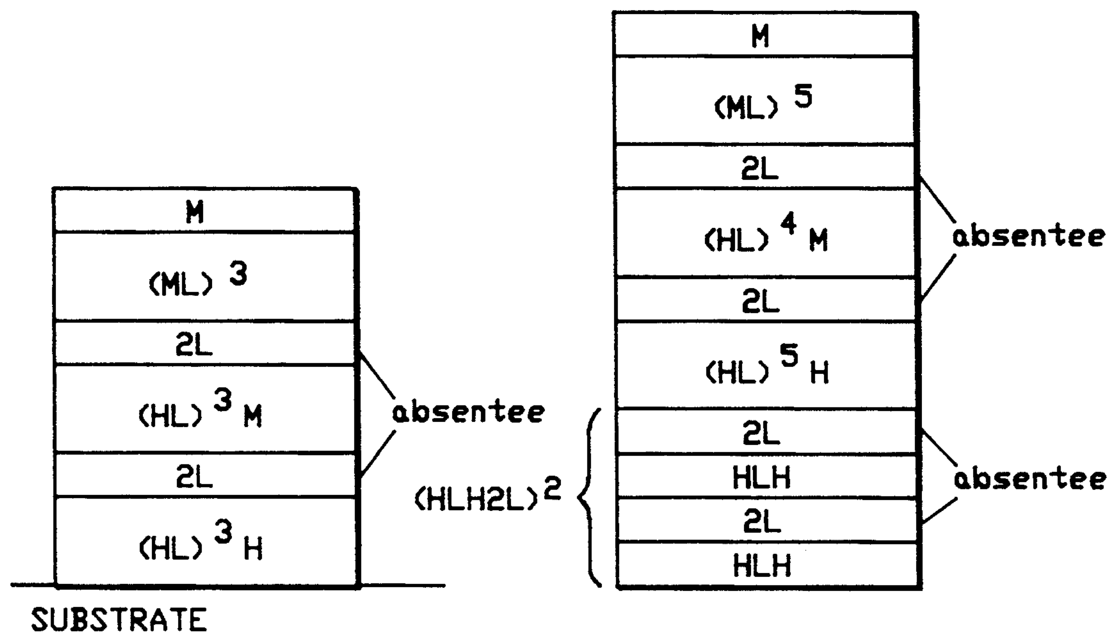
FIG.—2A
FIG.—3A
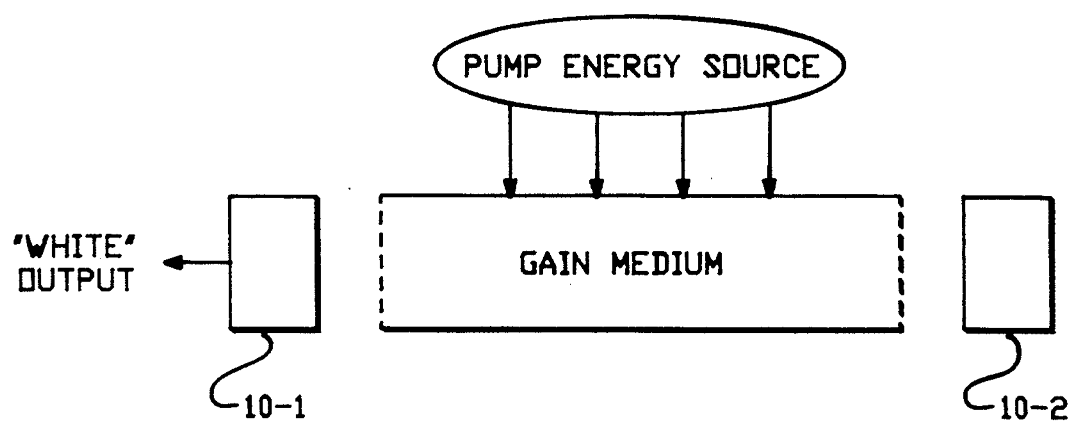
FIG.—4

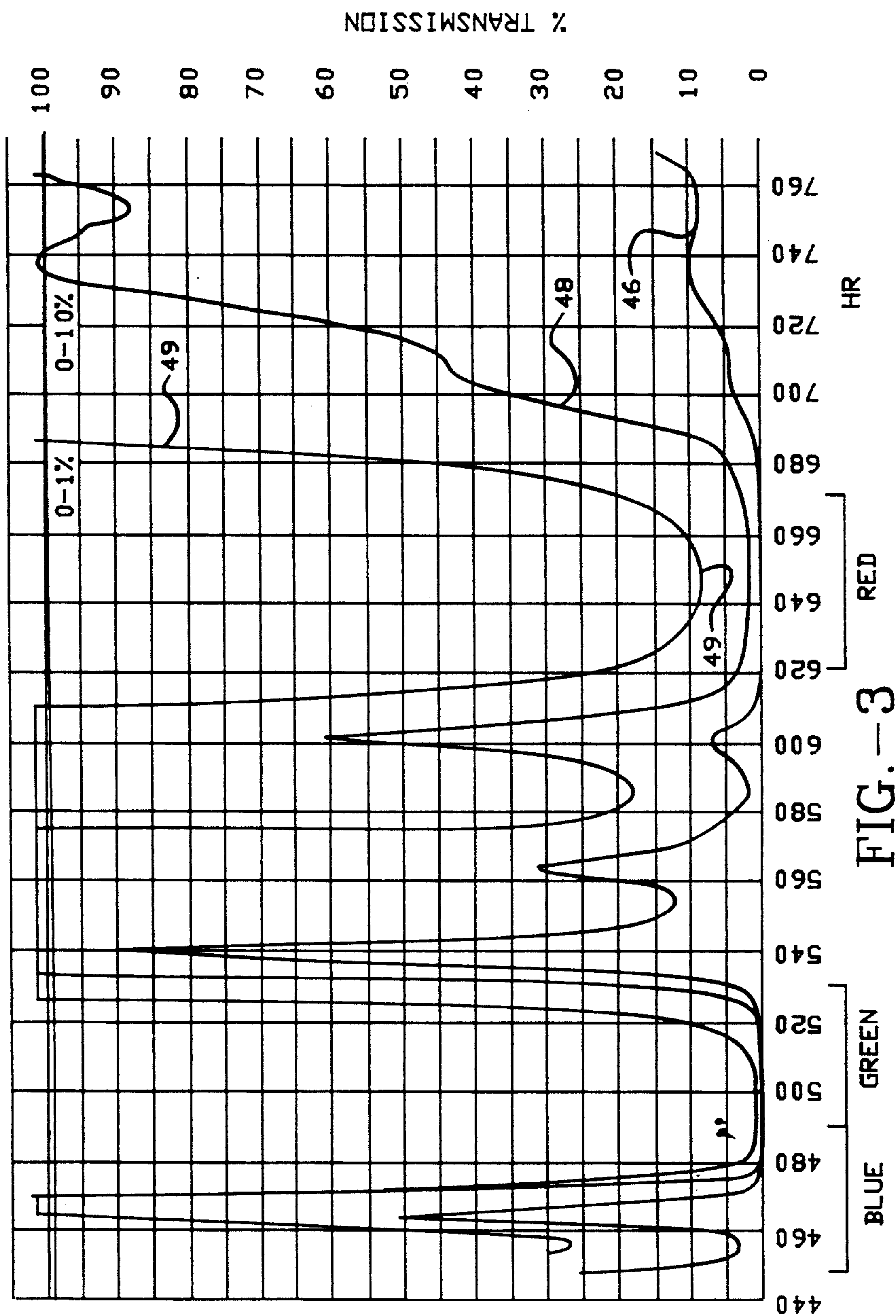
FIG.—3

METHOD FOR MANUFACTURING RESONANT CAVITY FOR LASER

BACKGROUND OF THE INVENTION

1. Field of the Invention

The invention relates to a method for manufacturing a resonant cavity for laser.

2. Description of the Related Art

The conventional ion laser includes two reflecting optical elements placed at either end of a laser tube. In general, the optical elements are coupled directly to the laser tube; that is, the mirrors are mounted to the ends of the tube, with a glass frit, or solder glass joining the reflective portion of the element directly to the end of the laser tube. During the glass frit process, temperatures can reach up to 450° C. U.S. Pat. No. 4,893,314, inventors Shull, et al., assigned to Spectra-Physics, Inc., shows a mounting alternative wherein the laser optics are placed on an internal mount. A mirror seat is inserted into the interior of the laser tube and the optical element is mounted on the mirror seat with the reflective portion of the element on the opposite side of the mounting area.

Optical elements for a laser resonator may be manufactured by coating a substrate, made of a material such as glass, with a series of dielectric films to develop the desired reflectance/transmittance of the mirror, depending on whether the mirror is to be used as a high reflectance mirror or as an output coupler. As is well known, such coatings are generally comprised of a plurality of layers of dielectric material alternating between materials with high and low indices of refraction having optical thicknesses of $\lambda/2$ or $\lambda/4$, thereby defining a reflective surface based on the classic Fabrey-Perot interferometer. The number, index of refraction, and optical thickness of the layers is determined by the desired reflectivity or transmittance of the optical element.

Lasers utilizing resonator optics mounted directly to the laser tube are generally incompatible for use with dielectric coatings having high indices of refraction. This is due to the fact that the coated side of the substrate must be coupled directly to the tube. Exposure of high index material to the 450° C. frit temperature renders the coating useless. Coatings with high index dielectrics are preferable for making broad band or "white light" visible laser optics, and some ultra-violet laser applications because of the ease with which broadband reflectors may be manufactured. In a broad band or "white light" laser, the optical elements are required to reflect and transmit energy over a relatively large bandwidth encompassing red, green and blue regions of the visible spectrum. In a conventional laser tube having tube mounted laser optics, a large number of dielectric layers are required to achieve the desired reflective/transmissive characteristics over a broad waveband, since materials having sufficiently high thermal coefficients to be used in such coatings have lower indices of refraction generating lower interference effects. Optical elements with large numbers of layers tend to be extremely lossy due to the fact that diffraction and interference takes place at each individual layer interface.

One way to reduce the number of layers is to use materials with high indices of refraction to increase the ratio between the respective indices of refraction of the high index layers and the low index spacer material.

However, while many materials having higher indices of refraction are available, such materials have low thermal coefficients of expansion, therefore making them susceptible to damage during the high temperature frit process as they are coupled to the laser tube. Thus, coatings utilizing a large high/low index ratio would have a tendency to craze due to the varying thermal gradients between the high index layers and the low index, or "spacer" layers and the laser mirror substrate material.

Another problem with conventional coatings stems from exposure damage from the internal environment of the completed resonant cavity. Ultraviolet radiation, generated by arc discharge within the laser tube, tends to deteriorate the coatings over time, reducing their effectiveness. In addition, the vacuum environment itself has a deleterious effect on the coating.

Thus, it is desireable to produce a laser resonant cavity through a method which avoids exposure of the finished optical elements to high temperature frit processing, and which has optical elements suitable for use over a wide bandwidth.

SUMMARY OF THE INVENTION

Thus, there is provided a method for manufacturing ion laser. The method allows for manufacturing a laser tube in a manner in which the coatings of the laser optics are not exposed to high temperatures associated with the processes of coupling laser optics directly to the laser tube in a conventional laser. As a result, a wide variety of materials suitable for manufacturing dielectric coatings may be used in the laser structure, such coatings being heretofore unusable due to their low thermal coefficients and thus their tendency to craze during coupling to the laser tube. The method allows the substrate to be coated after the substrate is coupled to the substrate mount, thereby avoiding the high temperature frit process.

In one aspect, the invention comprises a method for affixing the optics of a laser to a laser tube, comprising: providing a substrate seat; coupling a substrate to the seat; coating the substrate with a multilayer thin film coating; and securing the substrate seat to the laser tube.

In another aspect the method for manufacturing the tube comprises: providing a laser tube having first and second ends; securing a substrate mount, having a coated output coupler secured thereto, into one end of the laser tube; securing a substrate mount, having a coated reflecting mirror secured thereto, into the other end of the laser tube; and sealing the tube, such as by exposing the laser tube to a heating process.

In a further aspect, the method includes a step, prior to the step of exposing the laser tube to a heat seal process, of evacuating the laser tube.

The step of securing the substrate mount with a coated output coupler may comprise the steps of: providing a substrate having a first and second sides; providing an anti-reflective coating to the first side of the substrate; providing a substrate mount; coupling the first side of the substrate to the mount; coating the second side of the substrate with a multilayer thin film coating; and securing the substrate mount to the laser tube. The step of securing the substrate mount with a coated reflecting mirror may comprise the steps of: providing a substrate having a first and second side; providing a substrate mount; coupling the first side of the substrate to the mount; coating the second side of the substrate with a multilayer thin film coating; and securing the substrate mount to the laser tube.

Other aspects and advantages may be seen on review of the drawings, the detailed description and the claims which follow.

BRIEF DESCRIPTION OF THE DRAWINGS

The invention will be described with respect to the particular embodiments thereof. Other objects, features, and advantages of the invention will become apparent with reference to the specification and drawings in which:

FIG. 1 is a cross-section of an exemplary laser resonator formed in accordance with the method of the present invention.

FIG. 2 is a graph of the transmittance versus wavelength for an output coupler fabricated in accordance with the novel coating structure set forth in the specification.

FIG. 2A is a block representation of the coating stack structure of the present invention for an output coupler disposed on a substrate.

FIG. 3 is a graph of the transmittance versus wavelength for a high reflectance mirror fabricated in accordance with the novel coating structure set forth in the specification.

FIG. 3A is a block representation of the coating stack structure of the present invention for a high reflectance element disposed on a substrate.

FIG. 4 is a block diagram of a laser formed using the high reflector and output coupler in accordance with the present invention.

DESCRIPTION OF THE PREFERRED EMBODIMENT

FIG. 1 shows an internal mirror, ion laser resonant cavity utilizing a mirror mount described in U.S. Pat. No. 4,893,314 (hereafter the '314 patent). As will be discussed below, the unique mounting structure of the optical elements in the resonant cavity makes possible a novel method of manufacture for the resonant cavity providing specific advantages with respect to deposition of the dielectric coatings onto the substrate and the materials which may be used in the coating. More particularly, the mounting structure shown in the '314 patent allows for the use of a manufacturing process wherein the laser resonator is fabricated without exposing the thin film dielectric coatings to the high temperature frit process normally required to mount the substrate to the resonator tube.

FIG. 1 shows a laser tube 11 having walls 12, a mirror seat 14, and mirror 10. Substrate seat 14 has a first length 16, which has an outside diameter closely matched to the inside diameter of the laser tube defined by walls 12. Second length 18 of substrate seat 14 has an outside diameter smaller than the inside diameter of the tube formed by walls 12. A passage 13 is provided in second length 18 of substrate seat 14 for the laser output. As specified in the '314 patent, the optical element 10 may be attached to the end of second length portion 18 by a glass frit, solder glass, or other known methods. Seat 14 may be attached to the ends of tube walls 12 by a fusion weld, such as a heliarc or TIG weld, to form a vacuum seal. Weld beads 24 are shown at the end of tube 12 and mirror seat 14.

Conventionally, dielectric coatings are applied to the optical substrates prior to securing the coated substrate to the laser tube. In accordance with the method of the invention, the optical substrate is glass fritted to the substrate seat 14 prior to the deposition of dielectric thin film coatings thereon. Thereafter, the optical substrate may be subjected to dielectric coating deposition, with the coatings applied to one side **10*a* of the optical substrate which is opposite side 10*b* of the substrate attached to mirror mount. Finally, seat 14, with coated optical substrate 10 attached thereto, may be welded to tube body 12. Tube 12** is thereafter evacuated and passed to a vacuum after passing through a sealing process at temperatures of approximately 200°-250° Celsius.

In manufacturing the assembled laser tube shown in FIG. 1, a first substrate 10-1 may be provided into one end of the laser tube 12 and a second substrate 10-2 is provided into the opposite end of laser tube 12.

Generally, substrates 10-1 and 10-2 are fabricated to comprise a high reflector mirror and an output coupler. In accordance with the method of the present invention, side **10*b* of substrate 10-1 is attached to one substrate seat 14. Thereafter, side 10*a* of substrate 10-1 is coated with alternating layers of high and low index materials to form a coating which has a high reflectance. Seat 14, with coated substrate 10-1 attached thereto, is then coupled to one end of tube body 12, generally by welding seat 14 thereto. To form an output coupler, side 10*b* of substrate 10-2 is first coated with an antireflective coating. Side 10*b* of substrate 10-2 is thereafter attached to a substrate seat 14, and side 10*a* of substrate 10-2 is coated with alternating layers of high and low index materials to form a coating which is highly reflective, and partially transmissive. Seat 14 with coated substrate 10-2 attached thereto, is then coupled to one end of tube body 12, generally by welding seat 14** thereto.

It should be understood that processing of the substrates 10-1, 10-2 may occur simultaneously, and each substrate/substrate seat assembly installed in the tube after the particular coatings have been applied thereto.

The tube structure shown in FIG. 1, and particularly the method described above for manufacturing tube 11, provides unique advantages in the manufacture of broad band or multiband lasers. Since the dielectric thin film coatings applied to the substrates used to form optic elements 10 are not exposed to high temperature frit processing, different materials, having higher indices of refraction and lower thermal coefficients not normally conducive to use with the conventional, direct tube mounted mirror resonators, may be utilized in the formation of the coatings. Further, the potential for craze of the dielectric coatings is significantly reduced, since the coatings are exposed only to the 200°-250° C. tube outgassing process. The use of materials with a higher index of refraction increases the ratio between the respective layers of high and low index material to allow for increased reflectance with a reduction in coating thicknesses through a reduction in the number of layers necessary to obtain the desired reflectivity over a wide bandwidth structure. In addition, other high index materials which are less susceptible to the deleterious effects of intracavity conditions, can be used in the resonant cavity. This has allowed for the development of a coating structure suitable for use as either a high reflectance mirror or an output coupler, wherein at least two discrete bandwidths with high absorption and transmission in certain spectral regions may be provided from a minimum number of dielectric layers.

The coating design of the present invention is advantageous in the manufacture of a "white light" laser, wherein the desired wavelengths include the red, green and blue regions of the spectrum, generally classified into the bandwidths: red 780–622 (nm); green 577–492 (nm); and blue 492–455 (nm).

The coating structure of the present invention applies the principles of thin film technology and the use of absentee layers to a laser resonator. The coating structure of the present invention allows for reduced absorption and scattering through all spectral regions of interest by providing for uniform treatment of losses at desired wavelengths through the use of at least one absentee layer to simultaneously produce two stopbands. In this context, the term stopband refers to a regions of wavelength in which the optic is substantially reflective separated by a region in which the optic is substantially transmissive. The number of absentee layers, and their location in the design stack, will determine the separation and the bandwidths of the stopbands. In one embodiment, at least one absentee layer may be utilized to form at least two stopbands. In an alternative embodiment multiple absentee layers may be utilized to form two or more stopbands.

Table 1 shows one embodiment of the structure for fabricating an output coupler for use in one embodiment of the instant invention. For each layer 1-21, the index of refraction (n), the dielectric constant (k) and the optical thickness, in nanometers, are shown.

TABLE 1

| Layer No. | Material | n | k | Optical Thickness (NM) |
|---|---|---|---|---|
| 0 | BK7 | 1.4595 | 0.0000E + 00 | Massive |
| 1 | $TiO_2$ | 2.3129 | −0.2692E − 04 | 508.16 |
| 2 | $SiO_2$ | 1.4450 | 0.0000E + 00 | 537.72 |
| 3 | $TiO_2$ | 2.3129 | −0.2692E − 04 | 747.47 |
| 4 | $SiO_2$ | 1.4450 | 0.0000E + 00 | 732.89 |
| 5 | $TiO_2$ | 2.3129 | −0.2692E − 04 | 540.75 |
| 6 | $SiO_2$ | 1.4450 | 0.0000E + 00 | 543.12 |
| 7 | $TiO_2$ | 2.3129 | −0.2692E − 04 | 521.71 |
| 8 | $SiO_2$ | 1.4450 | 0.0000E + 00 | 1190.42 |
| 9 | $TiO_2$ | 2.3129 | −0.2692E − 04 | 501.10 |
| 10 | $SiO_2$ | 1.4450 | 0.0000E + 00 | 539.74 |
| 11 | $TiO_2$ | 2.3129 | −0.2692E − 04 | 522.95 |
| 12 | $SiO_2$ | 1.4450 | 0.0000E + 00 | 551.79 |
| 13 | $TiO_2$ | 2.3129 | −0.2692E − 04 | 518.78 |
| 14 | $SiO_2$ | 1.4450 | 0.0000E + 00 | 542.05 |
| 15 | $HfO_2$ | 2.0193 | −0.3367E − O5 | 515.99 |
| 16 | $SiO_2$ | 1.4450 | 0.0000E + 00 | 1206.03 |
| 17 | $HfO_2$ | 2.0193 | −0.3367E − O5 | 522.72 |
| 18 | $SiO_2$ | 1.4450 | 0.0000E + 00 | 534.89 |
| 19 | $HfO_2$ | 2.0193 | −0.3367E − O5 | 528.20 |
| 20 | $SiO_2$ | 1.4450 | 0.0000E + 00 | 542.27 |
| 21 | $HfO_2$ | 2.0193 | −0.3367E − O5 | 519.02 |
| 22 | VACUUM | 1.0000 | 0.0000E + 00 | Massive |

As shown therein, approximately twenty-one (21) layers of material comprising titanium dioxide ($TiO_2$), silicon dioxide ($SiO_2$), and hafnium dioxide ($HfO_2$) are deposited onto a glass substrate, such as Schott BK-7, to form an output coupler having two transmissive bands over particular regions of interest. The coating shown in Table 1 is specifically designed for use with a "white light" laser wherein the particular bands of interest comprise the red/green/blue regions of the visible light spectrum.

Table 1 defines the coating as comprising approximately fourteen (14) stratified layers of titanium dioxide and silicon dioxide, seven (7) layers each. Overlying the final layer of silicon dioxide in the first fourteen (14) layer section of the coating, is a layer of hafnium dioxide. This layer begins a sequence of approximately seven (7) layers of overlapping hafnium dioxide/silicon dioxide structure, four (4) layers of hafnium, three (3) of silicon dioxide. Titanium dioxide and hafnium dioxide materials have indices of refraction, 2.31 and 2.01, respectively at about 500 nm. The silicon dioxide is a low index material, having an index of refraction of 1.44. As will be further noted, the respective optical thicknesses, in nanometers, of each layer of the coating is approximately equal, with the exception of layer numbers 8 and 16. The optical thickness ranges from 501 nm (layer number 9) to a maximum of 747.47 nm, for all layers but layers 8 and 16. The mean optical thickness of all layers, excluding layers 8 and 16, is 551.05 nanometers. Layers 8 and 16, both silicon dioxide layers, have optical thicknesses of 1190.42 nanometers and 1206.03 nanometers, respectively, approximately twice that of the mean thickness of all the other layers in the design stack. These nested contiguous stacks of half-wave layers define the particular stopbands of interest in the output coupler, as shown in FIG. 2.

As will be generally understood by those skilled in the art, the index structure of the coating specified in Table 1, generally takes the form: (Substrate) $(HL)^3$ H2L $(HL)^3$ H2L $(HL)^2$ H (Vacuum), where: H = a high index material, L = a low index material, and superscripted numbers indicate the number of times the sequences within the parenthesis are repeated, e.g., $(HL)^3$ = HLHLHL. More particularly, the structure may be expressed as (Substrate) $(HL)^3$ H2L $(HL)^3$ M2L $(ML)^3$ M (Vacuum), where M is an intermediate index material having a resistance to intra cavity effects which is superior to H. In one embodiment H = $TiO_2$, M = $HfO_2$, and L = $SiO_2$.

FIG. 2 shows the characteristics of the structure defined in Table 1. FIG. 2 graphically depicts the percentage of transmission for the coating defined in Table 1 from a Tungsten light source impinging the coating at an angle of incidence of 0° at room temperature. In FIG. 2, the abscissa represents the percentage of transmission of radiation, in the form of visible light, through the optical structure defined in Table 1. The ordinate represents the wavelength of the radiation incident on the optical element. Three scales of indicia are shown in FIG. 2. Indicia 36 is a full scale representation ranging from 0 to 100 percent transmission through the optical element. Indicia 38 is a 0 to 10 percent scale and indicia 39 is a 0 to 1 percent scale, further resolving the transmission peaks of radiation through the optical element.

Two stopbands are shown at indicia 32 and 34. A first stopband region extends between approximately 460 nm to 530 nm, and a second stopband region extends from approximately 595 nm to 670 nm. As shown by indicia 39, the output coupler defined in Table 1 has transmission values of approximately 0.85 and 0.65%) at peaks between 482–485 nm and 635–640 nm. With reflectivity R equal to 1−T (assuming negligible scatter and absorption losses), the output coupler is highly reflective and partially transmissive over bandwidths in the red (620 nm−∼670), green (495 nm−∼530) and blue (455 nm−∼495) spectral regions, with non-transmissive peaks (at 482–485 and 635–640 nm) separating the stopband regions. When used in a ion laser tube, in conjunction with an appropriate excitation medium, such as krypton and argon, and a high reflector as discussed below, a novel resonant cavity which produces an output over the red, green and blue regions of the spectrum is provided.

Table 2 shows a structure for fabricating a high reflectance optical element for use in conjunction with the output coupler defined in Table 1. Again, for each layer 1-36, the index of refraction (n), the dielectric constant (k), and the optical thickness, in nanometers, is shown.

TABLE 2

| Layer No. | Material | n | k | Optical Thickness (nm) |
|---|---|---|---|---|
| 0 | BK7 | 1.5176 | 0.0000E + 00 | Massive |
| 1 | $TiO_2$ | 2.3129 | −0.2692E − 04 | 593.20 |
| 2 | $SiO_2$ | 1.4450 | 0.0000E + 00 | 606.36 |
| 3 | $TiO_2$ | 2.3129 | −0.2692E − 04 | 660.74 |
| 4 | $SiO_2$ | 1.4450 | 0.0000E + 00 | 1043.78 |
| 5 | $TiO_2$ | 2.3129 | −0.2692E − 04 | 540.84 |
| 6 | $SiO_2$ | 1.4450 | 0.0000E + 00 | 578.69 |
| 7 | $TiO_2$ | 2.3129 | −0.2692E − 04 | 545.03 |
| 8 | $SiO_2$ | 1.4450 | 0.0000E + 00 | 1150.91 |
| 9 | $TiO_2$ | 2.3129 | −0.2692E − 04 | 552.52 |
| 10 | $SiO_2$ | 1.4450 | 0.0000E + 00 | 566.91 |
| 11 | $TiO_2$ | 2.3129 | −0.2692E − 04 | 565.53 |
| 12 | $SiO_2$ | 1.4450 | 0.0000E + 00 | 546.84 |
| 13 | $TiO_2$ | 2.3129 | −0.2692E − 04 | 508.53 |
| 14 | $SiO_2$ | 1.4450 | 0.0000E + 00 | 1193.68 |
| 15 | $TiO_2$ | 2.3129 | −0.2692E − 04 | 470.87 |
| 16 | $SiO_2$ | 1.4450 | 0.0000E + 00 | 543.36 |
| 17 | $TiO_2$ | 2.3129 | −0.2692E − 04 | 555.20 |
| 18 | $SiO_2$ | 1.4450 | 0.0000E + 00 | 562.84 |
| 19 | $TiO_2$ | 2.3129 | −0.2692E − 04 | 553.77 |
| 20 | $SiO_2$ | 1.4450 | 0.0000E + 00 | 565.80 |
| 21 | $TiO_2$ | 2.3129 | −0.2692E − 04 | 568.67 |
| 22 | $SiO_2$ | 1.4450 | 0.0000E + 00 | 588.40 |
| 23 | $HfO_2$ | 2.0193 | −0.3367E − 05 | 454.33 |
| 24 | $SiO_2$ | 1.4450 | 0.0000E +00 | 1141.15 |
| 25 | $HfO_2$ | 2.0193 | −0.3367E − 05 | 495.14 |
| 26 | $SiO_2$ | 1.4450 | 0.0000E + 00 | 560.62 |
| 27 | $HfO_2$ | 2.0193 | −0.3367E − 05 | 548.98 |
| 28 | $SiO_2$ | 1.4450 | 0.0000E + 00 | 561.60 |
| 29 | $HfO_2$ | 2.0193 | −0.3367E − 05 | 551.07 |
| 30 | $SiO_2$ | 1.4450 | 0.0000E + 00 | 544.24 |
| 31 | $HfO_2$ | 2.0193 | −0.3367E − 05 | 551.82 |
| 32 | $SiO_2$ | 1.4450 | 0.0000E + 00 | 468.71 |
| 33 | $HfO_2$ | 2.0193 | −0.3367E − 05 | 515.86 |
| 34 | $SiO_2$ | 1.4450 | 0.0000E + 00 | 417.03 |
| 35 | $HfO_2$ | 2.0193 | −0.3367E − 05 | 320.03 |
| 36 | VACUUM | 1.0000 | 0.0000E + 00 | Massive |

As shown in Table 2, a high reflectance coating in accordance with the present invention comprises thirty-five (35) layers of dielectric material disposed on a BK-7 glass substrate. The first twenty-two (22) layers overlying the substrate are comprised of alternating layers of titanium dioxide and silicon, eleven (11) layers each. Thirteen (13) layers of hafnium dioxide and silicon dioxide overlie the twenty-two (22) layers of titanium dioxide and silicon dioxide. Approximately seven (7) layers of hafnium and six (6) layers of silicon dioxide are provided. Layers 4, 8, 14, and 24 have optical thicknesses of 1043.78 nanometers, 1150.91 nanometers, 1193.68 nanometers and 1141.15 nanometers, respectively. Again, the optical thickness of these layers is approximately twice that of the mean optical thickness (490.53 nanometers) of all other layers in the stack, excluding layers 4, 8, 14 and 24.

In general, the index structure of the coating shown in Table 2 takes the form: (Substrate) $(HLH2L)^2$ $(HL)^5$ $H2L(HL)^4$ $H2L(HL)^5H$ (Vacuum). More particularly, the structure may be expressed as (Substrate) $(HLH2L)^2$ $(HL)^5$ $H2L(HL)^4$ $M2L(ML)^5M$ (Vacuum) where H, L and M have the same definitions as noted above.

FIG. 3 shows the characteristics of the coating structure defined in Table 2. Again, the percentage of transmission resulting from a tungsten light source impinging on the optical element at a 0° angle of incidence at room temperature is depicted. The ordinate represents the percent transmission with respect to the particular scale in use (indicia 46=100%; indicia 48=10%; and indicia 49=1%) and the abscissa represents the wavelength incident on the optical element. As shown therein, over the range of approximately 465 nm to 525 nm, the coating is nearly 100 percent reflective, i.e., 0.01 percent transmissive, as is clarified by indicia 49. A second band of high reflectance (approximately 99.9 percent) is present over the range of approximately 620 nanometers to 670 nanometers.

Thus, when the coatings defined in Table 1 and Table 2 are used, respectively, on substrates 10-1 and 10-2 in the optical resonator shown in FIG. 1, with an active medium such as argon or argon-krypton gas, a lasing environment will be developed between the mirrors at the particular wavelengths in the stopband regions of the elements. The output coupler will allow selective transmittance of the visible spectrum defined over the red/green/blue spectral bands shown in FIGS. 2 and 3 as resonance over the selected frequencies develops. As noted above, the method of manufacture of the laser described above allows use of the high index material of titanium dioxide in the coating structure.

One novel characteristic of the coating structures of the present invention to the fact that the design of both the output coupler and high reflector utilizes a single wavelength stack coating structure in creating three stopband regions. Each quarterwave layer is approximately equal in optical thickness, being approximately one quarter wavelength elements at a single wavelength. In past designs, multiple wavelength stacks were used to create the three stopbands necessary for white light resonator optics.

It is particularly noteworthy that the coating structures shown in Tables 1 and 2 have a hybrid structure. That is, two different high index materials, in conjunction with the $SiO_2$ spacer layers, are utilized. This hybrid structure presents distinct advantages. First, hafnium dioxide, through having a high index of refraction, tends to craze under the frit temperatures normally utilized with lasers incorporating mirrors sealed directly to the tube structure. However, hafnium dioxide is a much more durable and has lower radiant absorption characteristics than titanium dioxide and, as a result, by placing the hafnium layers adjacent to the internal laser excitation region, the optical elements do not deteriorate as rapidly as they would if manufactured from other compounds, minimizing material deterioration and extending both the life and stability of the laser. Further, by using the higher index titanium dioxide as the innermost layers, a reduction in the number of layers in the coating structure can be achieved with no sacrifice in the amount of reflectance which results from the stack. The use of an entirely hafnium structure and the design of the output coupler would result in a structure having approximately 38 layers or more.

Furthermore, the structures defined in Tables 1 and 2 provide reduced absorption and scattering through the spectral regions of interest by providing for a uniform treatment of losses at desired wavelengths through use of the absentee layers to simultaneously produce two stopbands. As should be readily understood, the number of absentee layers in the design stack and their location, as well as stack repetition and material indices therein, will determine the positions of the stopbands and the bandwidth thereof. This allows the coating design to be optimized to create resonance in particular spectral regions. In addition, alternative high index materials such as $Nb_2O_5$, having an index refraction of approximately 2.2, $Ta_2O_5$ having an index refraction of approximately 2.1, $ZrO_2$ having an index refraction of approximately 2.0, and $Al_2O_3$ having an index refraction of approximately 1.7 may be utilized in the design.

It should be recognized by those skilled in the art that the coating structure designed in accordance with the present invention should be designed to operate at wavelengths 1-2% longer than necessary if the coating is to be subjected to a vacuum bake to outgas the assembled laser tube in order to compensate for spectral shift of the coating.

Thus, the laser resonator discussed herein may be advantageously used over two specific bands of visible light. The coating structure and manufacturing method shown in the instant specification can be utilized in a number of different applications, such as ultraviolet argon in the 350 to 360 nanometer wavelength range or the blue-green argon in the 488 to 514 nanometer range. Further, this application could be utilized down to the 275 to 350 wavelength range. It should be understood that the invention disclosed herein with respect to the coating is applicable to any absentee layer providing reflectivity over two different stopbands.

The many features and advantages of the present invention should be obvious to those skilled in the art. The method allows for manufacturing a laser tube in a manner in which the coatings of the laser optics are not expsoed to high temperatures associated with the processes of coupling laser optics to the laser tube in a conventional externally mounted optics type laser. As a result, a wide variety of materials suitable for manufacturing dielectric coatings may be used in the laser structure, such coatings being heretofore unusable due to their low thermal coefficients and thus their tendency to craze during coupling to the laser tube. The method allows the substrate to be coated after the substrate is coupled to the substrate mount, thereby avoiding the high temperature frit process. These advantages and features are intended to be within the context of the invention, as defined by the instant specification, the drawings and the attached claims.

I claim:

1. A method for affixing the optics of a laser to the laser tube, comprising:

(a) providing a substrate seat;

(b) coupling a substrate to the seat;

(c) after the step of coupling, coating the substrate with a multilayer thin film coating; and (d) after the step of coating, securing the substrate seat to the laser tube.

2. The method of claim 1 wherein the coupling step includes a high temperature frit of the substrate to the seat.

3. The method of claim 2 further including the step of exposing the laser tube to a low temperature vacuum de-gassing process.

4. A method for manufacturing a resonant cavity, comprising:

(a) providing a laser tube having first and second ends;

(b) mounting a substrate for an output coupler on an output coupler mount, then coating the substrate to form the output coupler;

(c) securing the output coupler mount, having the output coupler secured thereto, into one end of the laser tube;

(d) mounting a substrate for a reflecting mirror on a mirror mount, then coating the substrate to form the reflecting mirror;

(e) securing the mirror mount, having the reflecting mirror secured thereto, into the other end of the laser tube; and (f) sealing the laser tube.

5. The method of claim 4 wherein step (f) comprises exposing the laser tube to a heating process by baking the tube at a temperature in the range of 200° C.-300° C.

6. The method of claim 4 further including, prior to step (f) the step of evacuating the laser tube.

7. The method of claim 4 wherein step (b) includes the steps of:

providing a substrate having a first and second sides;

providing an anti-reflective coating to the first side of the substrate;

providing the output coupler mount;

coupling the first side of the substrate to the output coupler mount;

then coating the second side of the substrate with a multilayer thin film coating to form the output coupler.

8. The method of claim 7 wherein the step of coupling the output coupler mount to the laser tube comprises welding the mount to the laser tube.

9. The method of claim 4 wherein step (d) includes the steps of:

providing a substrate having a first and second side;

providing the mirror mount, the mirror mount being completely insertable into the end of the laser tube;

coupling the first side of the substrate to the mirror mount;

then coating the second side of the substrate with a multilayer thin film coating to form the coated reflection mirror.

10. A method for manufacturing a laser tube, comprising;

(a) providing a laser tube, having a first end and a second end, suitable for containing an excitation medium;

(b) providing a first substrate seat, the substrate seat being mountable at one end of the laser tube;

(c) applying a first substrate to the substrate seat;

(d) coating the first substrate with a reflective coating;

(e) then affixing the coated substrate and substrate seat to the first end of the laser tube;

(f) providing a second substrate seat, the second substrate seat being mountable at one end of the laser tube;

(g) coating one side of a second substrate with an antireflective coating;

(h) applying the second substrate, having the antireflective coating thereon, to the second substrate seat by joining the one side to the substrate seat;

(i) coating an opposite side of the second substrate with a multilayer thin film coating;

(j) then affixing the second coated substrate and second substrate seat into the second end of the laser tube; and (k) evacuating the environment within the laser tube.

11. The method of claim 10 wherein the first substrate seat has a first portion of a first length and a first outside diameter closely matched with the inside diameter of the laser tube and a second portion of a second length and a second outside diameter smaller than the first outside diameter for attachment of the first substrate.

12. The method of claim 11 wherein the first substrate seat further includes means, in the second portion, for facilitating the deformation of at least the second portion of the first substrate seat to which the first substrate is attached.

13. The method of claim 10 wherein step (d) comprises applying a plurality of thin film layers to the first substrate to achieve a substantially reflective coating over two wavelength regions separated by a substantially transmissive region.

14. The method of claim 13 wherein the thin film coating comprises a plurality of thin film layers of having at least one absentee layer providing at least two partially reflective and partially transmissive bandwidths.

15. The method of claim 10 wherein the reflective coating comprises a multilayer thin film coating having at least one absentee layer, having a first plurality of thin film layers having a first index of refraction, a second plurality of thin film layers having a second index of refraction and a third plurality of thin film layers having a third index of refraction.

16. The method of claim 10 wherein step (i) comprises applying a plurality of thin film layers to the second substrate to achieve a reflective coating having at least two transmission bands.

17. The method of claim 16 wherein the thin film coating comprises a coating having the structure:

$$(HL)^3\ H2L\ (HL)^3\ H2L\ (HL)^2\ H$$

where

H=a dielectric material having an index of refraction of 1.7 or greater; and

L=a dielectric material having an index of refraction of 1.5 or less.

18. The method of claim 17 wherein the coating comprises:

$$(HL)^3\ H2L\ (HL)^3\ M2L\ (ML)^2\ M$$

where

M=a dielectric material having an index of refraction of 1.7 or greater and having a higher resistance to intracavity effects than material H.

19. The method of claim 18 wherein material H comprises titanium dioxide, material L comprises silicon dioxide, and material M comprises hafnium dioxide.

20. The method of claim 16 wherein the reflective coating comprises a coating having the structure:

$$(HLH2L)^2\ (HL)^5\ H2L\ (HL)^4\ H2L\ (HL)^5\ H$$

where

H=a dielectric material having an index of refraction of 1.7 or greater; and

L=a dielectric material having an index of refraction of 1.5 or less.

21. The method of claim 20 wherein the reflective coating comprises a coating having the structure:

$$(HLH2L)^2\ (HL)^5\ H2L\ (HL)^4\ M2L\ (ML)^5\ M$$

where

M=a dielectric material having an index of refraction of 1.7 or greater and having a higher resistance to intracavity effects than material H.

22. The method of claim 21 wherein material H comprises titanium dioxide, material L comprises silicon dioxide, and material M comprises hafnium dioxide.

23. The method of claim 10 wherein the first and second substrate seats are insertable in the respective first and second ends of the laser tube and steps (e) and (j) each include inserting the first and second substrate seats into the respective first and second ends of the laser tube; and welding the first and second substrate seats to the laser tube.

24. A method for manufacturing a resonant laser cavity, comprising:

(a) providing a laser tube;

(b) providing a first and second substrates, each having a first and second sides;

(c) applying a first substrate to a first substrate mount by securing the first side to the mount;

(d) coating the second side of the first substrate with a series of thin films to form an output coupler;

(e) securing the first substrate mount to the first end of the laser tube;

(f) applying the first side of the second substrate to a second substrate mount;

(g) coating the second side of the second substrate with a series of thin films to form a mirror; and (h) securing the second substrate mount to the second and of the laser tube.

25. The method of claim 24 wherein steps (e) and (h) each include: inserting the respective first and second substrate seats into the laser tube; and welding the first and second substrate seats to the laser tube.

26. A method for affixing an optical element of a laser to the laser tube, comprising;

(a) providing a substrate seat, the substrate seat being completely insertable into the end of the laser tube;

(b) coating one side of a substrate with an anti-reflective coating;

(c) coating an opposite side of the substrate with a reflective, multilayer thin film coating;

(d) coupling the substrate to the seat; and (e) then securing the substrate seat to the laser tube.

27. A method of manufacturing a laser tube for an ion laser, comprising:

(a) providing a laser tube having a first end and a second end;

(b) providing a substrate mount;

(c) mounting a substrate to the substrate mount through a high temperature coupling process;

(d) coating the substrate with a multilayer thin film coating, the coating consisting of layers of high and low index materials having divergent thermal expansion coefficients; and (e) then mounting the substrate mount to one end of the laser tube through low temperature coupling process.

28. The method of claim 26 wherein the substrate has a first side and a second side, step (c) includes mounting the first side of the substrate to the substrate mount; and step (d) includes coating the second side of the substrate.

29. The method of claim 28 wherein step (c) comprises coupling the substrate to the substrate mount using a frit process exposing the substrate to temperatures in the range of about 250°-500° C.

30. The method of claim 27 wherein step (e) comprises welding the substrate mount to the laser tube.

31. The method of claim 27 further includes the step of:

(f) sealing the laser tube through a low temperature sealing process.

32. The method of claim 31 wherein step (f) includes exposing the laser tube to a bake process having temperatures less than about 300° C.

* * * * *